United States Patent [19]

Humbert et al.

[11] Patent Number: 5,148,961
[45] Date of Patent: Sep. 22, 1992

[54] SELECTIVE WAVE SOLDER APPARATUS

[75] Inventors: Gary A. Humbert, Arlington Heights; Robert W. Lela, Woodridge, both of Ill.

[73] Assignee: Motorola, Inc., Schaumburg, Ill.

[21] Appl. No.: 812,338

[22] Filed: Dec. 23, 1991

[51] Int. Cl.⁵ ............................................... B23K 1/08
[52] U.S. Cl. ........................................ 228/37; 228/260
[58] Field of Search ................. 228/180.1, 180.2, 260, 228/37, 56.1

[56] References Cited

U.S. PATENT DOCUMENTS

| | | | |
|---|---|---|---|
| 4,682,723 | 7/1987 | Grummet | 228/37 |
| 4,848,640 | 7/1989 | Gieskes | 228/37 |

FOREIGN PATENT DOCUMENTS

| | | | |
|---|---|---|---|
| 0201158 | 11/1986 | European Pat. Off. | 228/262 |
| 2428143 | 1/1976 | Fed. Rep. of Germany | 228/180.1 |
| 59-153570 | 9/1984 | Japan | 228/56.1 |
| 1-290293 | 11/1989 | Japan | 228/180.1 |
| 1-312892 | 12/1989 | Japan | 228/180.1 |

OTHER PUBLICATIONS

Air-Vac brochure for a wave solder module.
Air-Vac brochure for an apparatus for soldering and desoldering, 1987.

Primary Examiner—Richard K. Seidel
Assistant Examiner—Jeffrey T. Knapp
Attorney, Agent, or Firm—Kenneth W. Bolvin

[57] ABSTRACT

The selective wave soldering apparatus (101) of the present invention permits wave soldering of select components on a printed circuit board. This is accomplished by narrowing the flow of solder from the wave solder apparatus and creating the proper back pressure on two sides of the flow to form the proper height wave. The back pressure is created by an extended, angled lip (102) on one side and a trough (103) on the side opposite the lip. The trough (103) is open on top and has small openings in one end to slow the flow of molten solder from the trough (103).

3 Claims, 3 Drawing Sheets

SELECTIVE WAVE SOLDER APPARATUS

FIELD OF THE INVENTION

The present invention relates generally to manufacturing using a wave soldering process.

BACKGROUND OF THE INVENTION

Wave solder machines are typically used in a mass production process to greatly increase the quality and throughput of soldering of components to a printed circuit board. In some applications, the printed circuit board to be assembled has already been populated with components on one side before a conveyor system moves the board over a wave of molten solder. The solder adheres to the metal pads and component leads.

A typical wave solder machine cannot be used when previously reflowed soldered components are mounted on the side of the board to be wave soldered. If components are located on the side of the board that passes over the solder wave, these components and their solder joints may be damaged by the solder. The typical wave solder machine also does not protect specific areas of the board where solder is not desired. Additionally, the wave solder machine cannot be used when a select group of parts is to be soldered.

A wave solder nozzle that has been simply narrowed for the select group of parts will lose the wave characteristics necessary for creating a proper solder joint. These characteristics include a wave that is long enough to heat the part so that the solder will adhere properly. The solder wave mimics the motion of dipping a circuit board to be solder into a container of molten solder and raising it back out.

In cases where a wave solder machine cannot be used, the board must be hand-soldered. This is a time consuming and expensive process. There is a resulting need for a wave solder machine that can selectively solder areas of a printed circuit board having components on each side without damaging the components on the solder wave side.

SUMMARY OF THE INVENTION

The selective wave solder apparatus of the present invention creates a narrow molten solder wave to apply solder to an electronic assembly. The apparatus is comprised of a plenum that has a bottom opening and a top opening. The plenum permits the flow of the molten solder from the bottom opening through the top opening. First means for impeding the flow of molten solder from a first side of the top opening is coupled to the top opening. Second means for impeding the flow of molten solder from a second side of the top opening is coupled to the top opening. The second side is substantially opposite the first side.

DETAILED DESCRIPTION OF THE PREFERRED EMBODIMENT

The selective wave solder apparatus creates a narrow solder wave for selectively soldering components on a printed circuit assembly. By keeping the wave narrow, only the components that have been selectively located on the assembly for the wave solder process will pass through the narrow wave. Other components and areas on the assembly will not be damaged by the wave solder process.

Figure 1:
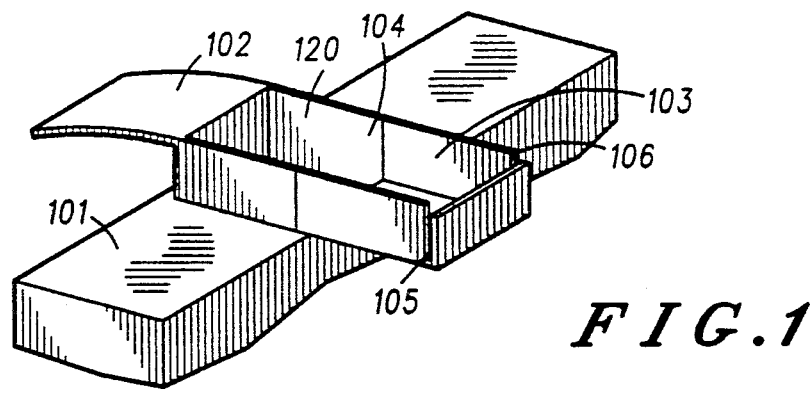
FIG. 1 shows a perspective view of the selective wave solder apparatus of the present invention.
Figure 2:
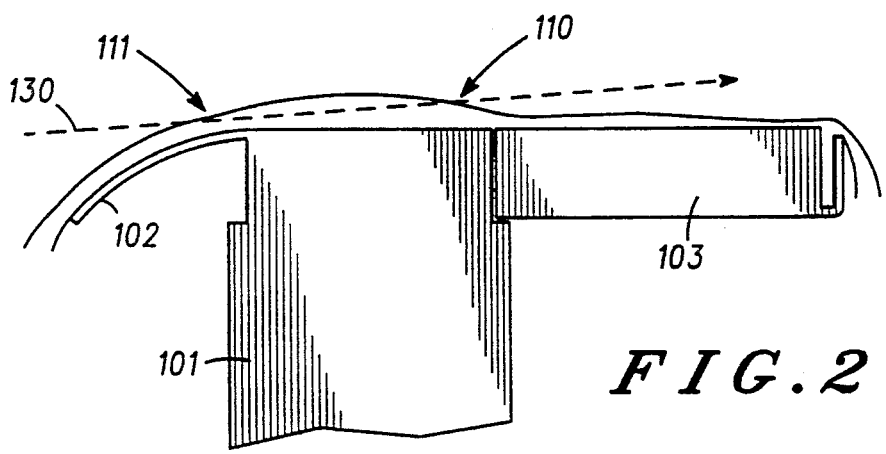
FIG. 2 shows a side view of the selective wave solder apparatus of the present invention.

The selective wave solder apparatus of the present invention is illustrated in FIGS. 1 and 2. The apparatus produces a narrow band of solder that mimics the physical properties of a conventional wave solder device. Referring to FIG. 2, the apparatus is comprised of three main sections: the plenum (101), a trough (103), and an extended lip area (102). For clarity, only the upper portion of the plenum is shown in FIGS. 1 and 2. FIG. 2 also shows the path (130) the printed circuit assembly travels through the solder wave.

As seen in FIG. 1, the plenum (101) channels molten solder from a molten solder source that is discussed later. The solder enters the plenum (101) from the bottom opening and exits through the top opening (120). One side of the top opening (120) has a notch (104) that extends the top opening down to the plenum (101), thus allowing the solder to flow out the notch as well as the top opening (120). The notch (104) is the same width as the top opening (120), one inch in the preferred embodiment, and extends down approximately 0.5 inch. This dimension can vary for different embodiments.

In the preferred embodiment, the top opening (120) has a rectangular shape and is one inch wide. The shape and size, however, are determined by the application. If the circuit board to be soldered requires a wider wave, the width of the top opening (120) can be increased. If the circuit board requires a narrower wave, the top opening (120) width can be decreased.

The trough (103) surrounds the notch on the sides and bottom and extends approximately one inch from the notch (104). The trough (103) is as wide and deep as the notch (104). The trough (103) end that is attached to the top opening (120) is open to the notch (104) thus extending the top opening. The opposite end of the trough (103) is partially blocked. In the preferred embodiment, the corners (105 and 106) of the end of the trough (103) are cut out to allow the solder to slowly flow out. Also in the preferred embodiment, the trough is constructed separately and attached to the plenum opening. In altenate embodiments, the trough and plenum may be constructed out of a single piece of material.

The trough (103) has three main purposes. First, by partially blocking one end, the flow of solder is slowed, thereby forming the back ridge (110) of the solder wave, as seen in FIG. 2. Without the backpressure, the solder wave would quickly drop off and the wave would not be properly shaped for adequate soldering.

The trough's (103) second purpose is to maintain thermal integrity of the flowing solder. Without the trough (103) to hold an amount of solder at the melting point, the end of the solder wave would cool to quickly, possibly causing inadequate solder joints. The trough's (103) final purpose is to provide a proper exit profile for the flowing solder.

The final element of the selective wave solder apparatus of the present invention is the extended lip area (102). The lip (102) is connected to the top opening (120) of the plenum (101) on the opposite side from the trough (103). The lip (102) is the same width as the top opening (120) and extends away from the opening (120) for approximately an inch and is angled down from the horizontal approximately 30°. In the preferred embodiment, the lip has an approximate radius of two inches. The length, angle, and radius of the lip (102) can be different for alternate embodiments, depending on the wave characteristics desired.

As seen in FIG. 2, the lip (102) is angled down to allow the solder flowing from the plenum (101) to flow down the length of the lip (102). This slows the exit of the solder from the plenum (101), thus creating the front ridge (111) of the solder wave. Without the lip (102), the solder would exit from the lip side too quickly causing the wave to lose the first ridge (111) and therefore be too short for adequate solder operations.

The lip area (102) and trough (103), therefore, combine to create the solder wave. The lip supports the front ridge (111) of the wave and the trough supports the back ridge (110).

Figure 3:
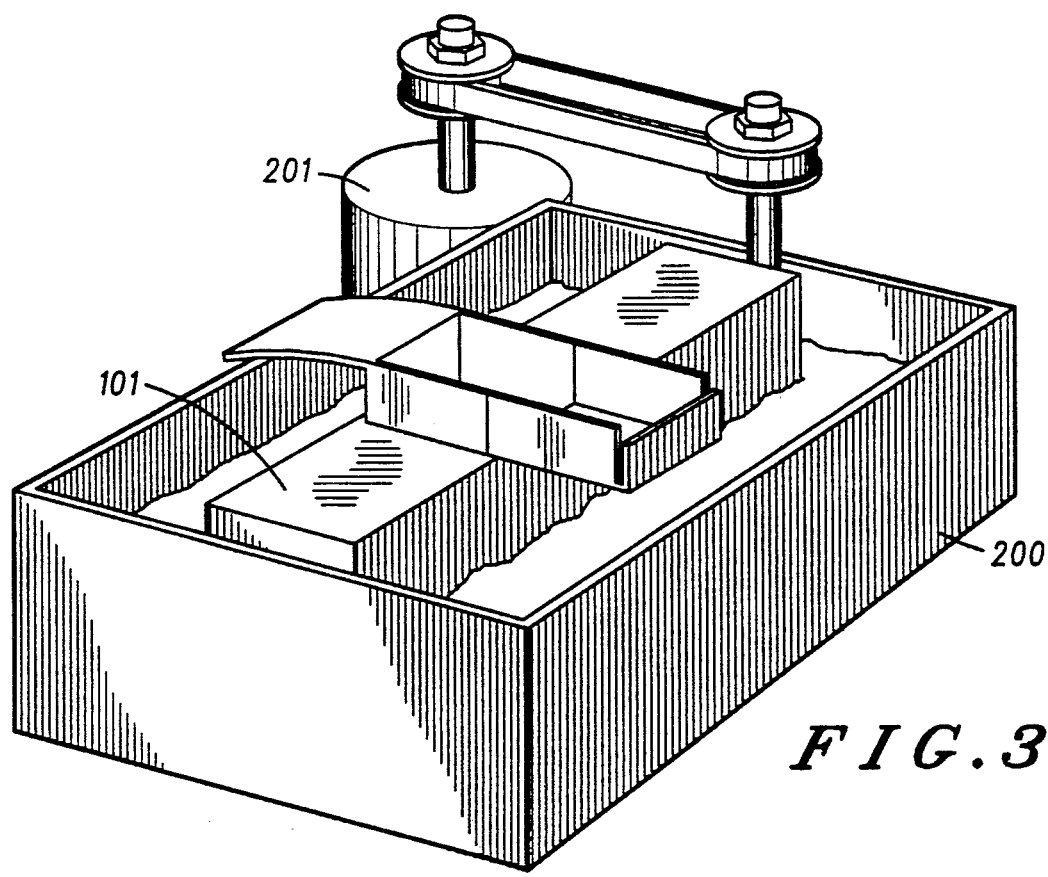
FIG. 3 shows the selective wave solder apparatus mounted in a solder pot.
Figure 6:
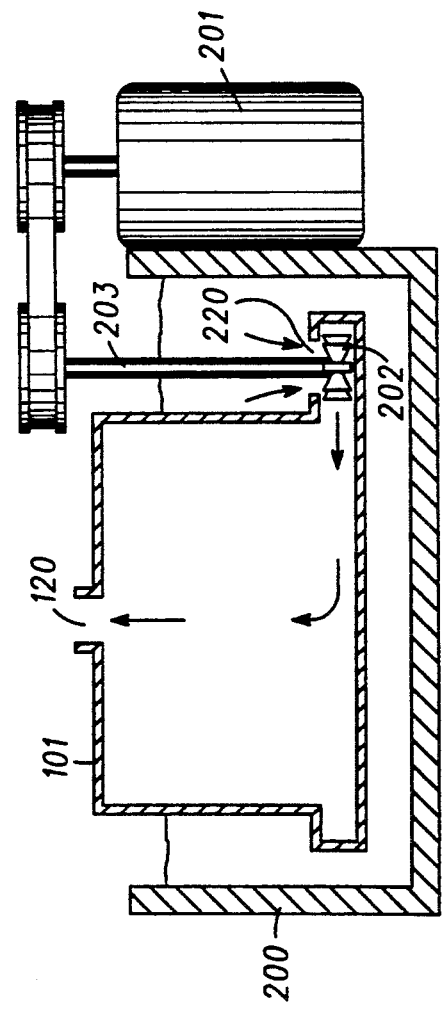
FIG. 6 shows a cutaway view of the selective wave solder apparatus mounted in the solder pot.

The selective solder apparatus (101) is mounted in a solder pot (200) as shown in FIG. 3. The solder pot (200), which keeps the solder at its melting temperature, is the source of the solder that creates the solder wave. The solder flow is created by an external motor (201) connected to an impeller (202) mounted on a long spindle (203), as illustrated in FIG. 6. The impeller (202) is located in the plenum's bottom opening (220). The impeller (202) forces the solder up through the selective solder apparatus thereby drawing more solder into the plenum's bottom opening (220). The solder flowing from the selective solder apparatus empties back into the solder pot (200) to be reused.

The assembly in FIG. 3 is part of a larger wave solder system. This system uses a conveyor (401), illustrated in FIG. 4, to transport the printed circuit board from the previous assembly station, through the solder wave, and to the next assembly station. In the preferred embodiment, four printed circuit boards are mounted side by side and secured to a pallet (402) for transportation by the conveyor system. For clarity, only one of the printed circuit boards is shown.

Figure 4:
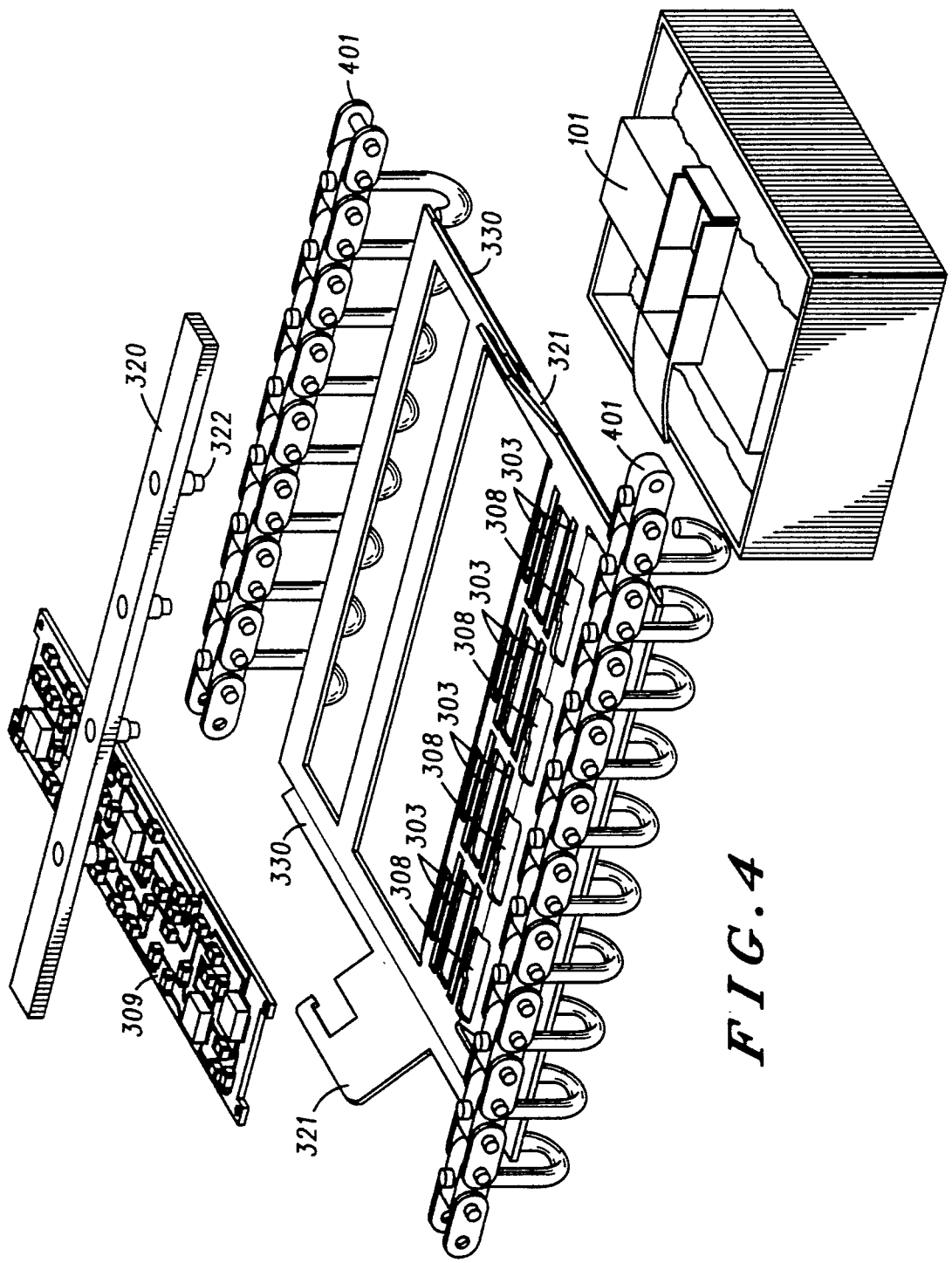
FIG. 4 shows the wave solder pallet of the present invention and its path in relation to the selective wave solder apparatus.
Figure 5:
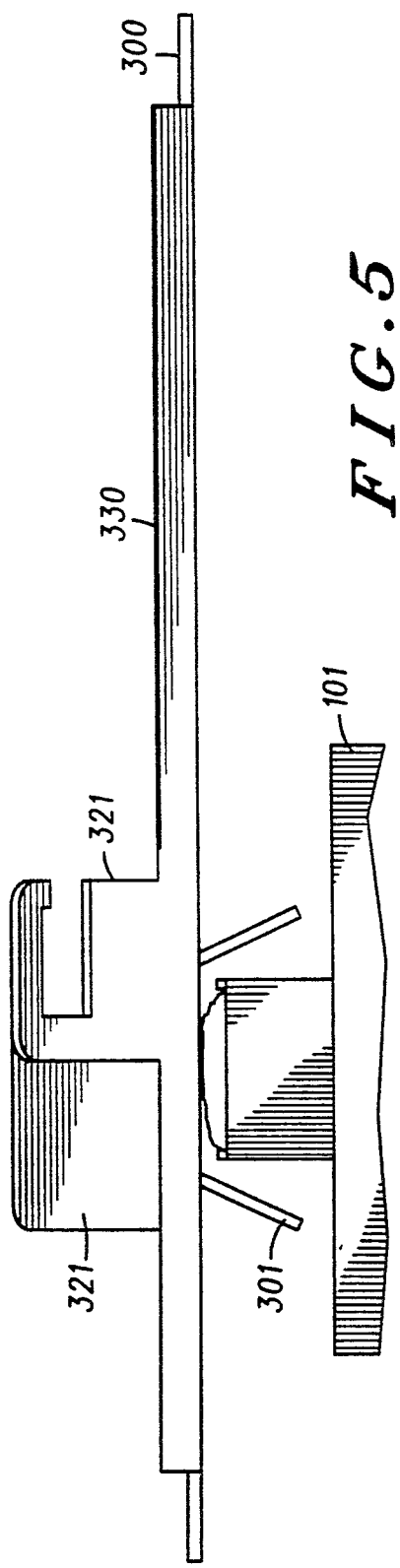
FIG. 5 shows a side view of the wave solder pallet of the present invention in conjunction with the selective wave solder apparatus.

The pallet (300) of the present invention, illustrated in FIGS. 4 and 5, is constructed so as to minimize exposure to the molten solder for the components that are not to be soldered. Referring to FIG. 5, the pallet has a V shaped channel (301) across the its width on the side that faces the selective wave solder apparatus. This channel (301) keeps the solder from splashing up on parts that can be damaged by the high temperature. The channel (301) is parallel with the direction of travel on the conveyor system (302) so that the selective wave solder apparatus runs the length of the channel as illustrated in FIG. 4. The channel must be of an appropriate width to allow the wave solder apparatus to pass through without contacting the pallet (300). In the preferred embodiment, the channel walls are angled 65° from the horizontal. This angle can be different for other embodiments.

Again referring to FIG. 4, the pallet (300) has slots (303) located in the channel bottom to allow the component leads that are to be soldered to protrude from the pallet (300). The side of the pallet (300) on which the printed circuit boards (309) are secured contains depressions (308) in the channel's bottom to allow parts that have already been secured to the printed circuit boards (309) to be protected from the solder wave. The depressions (308) have depths that are slightly greater than the actual heights of the components. This leaves a gap of air between the components and the pallet (300), preventing the heat from the pallet (300) to be transferred to the component.

Since the pallet (300) comes into contact with the solder wave, it must be comprised of a material that will not be damaged by the heat generated by the solder. In the preferred embodiment, the pallet (300) is comprised of titanium. This allows the pallet to be reused without deforming.

The printed circuit boards are secured to the pallet by a cross-member (320) that is inserted in brackets (321) located on each side of the pallet (300). The cross-member (320) has spring loaded, adjustable plungers (322) that exert a down pressure on the printed circuit boards (309) to keep them in place. One plunger (322) is used per circuit board (309). Two sides of the pallet (300) also have a slight lip (330) to help align the printed circuit boards (309) in the pallet (300).

For proper operation of the selective wave soldering apparatus, the select parts to be soldered must be aligned on the printed circuit board to fit within the channel of the pallet. FIG. 4 shows the slots (303) being parallel in the channel (301). Alternate embodiments, however, could have the components mounted at different angles and still be properly soldered.

The solder pumping must be precisely monitored to keep a constant wave height for proper soldering. In the preferred embodiment, this is performed by a closed loop control system that takes into account both static and dynamic pressures in the system. The static pressure being the force of the solder in the solder pot. The dynamic pressure is the pressure created by the impeller forcing the solder out the top opening. By keeping these forces constant, a constant pumping pressure can be maintained.

In summary, the selective wave soldering system disclosed above permits wave soldering of select components on a printed circuit board. This is accomplished by narrowing the wave solder apparatus and creating the proper back pressure on two opposing sides of the apparatus to create the proper height solder wave. The selective wave solder apparatus reduces the width of a solder wave to one inch from the fifteen inches of the prior art. Using the pallet of the present invention with the narrow slots further reduces this width to one quarter inch.

We claim:

1. A selective wave solder apparatus for creating a narrow wave of molten solder to apply the solder to selective components of a printed circuit assembly, the apparatus comprising:

a plenum, having a bottom opening and a top opening, for conducting the molten solder from the bottom opening to the top opening, the top opening having three extended sides and one lower side;

means for pumping the molten solder from the bottom opening through the top opening;

an extended lip, coupled to a first extended side of the top opening opposite the lower side and angled down from the top opening, for creating a first ridge in the molten solder; and a trough having a bottom coupled to the lower side of the top opening, a first side coupled to a second extended side of the top opening, and a second side coupled to a third extended side of the top opening, the trough additionally having a third side coupled to the trough bottom and at right angles to the trough's first and second sides, a gap separating the third side from the first and second sides, the trough creating a second ridge in the molten solder, the first and second ridges together forming the narrow wave of molten solder.

2. The selective wave solder apparatus of claim 1 wherein the top opening and trough are less than one inch in width.

3. A wave solder system for soldering select components of a printed circuit assembly, the system comprising:

means for conveying the printed circuit assembly through the wave of molten solder;

a selective wave solder apparatus comprising:

a plenum, having a bottom opening and a top opening, for conducting the molten solder from the bottom opening to the top opening, the top opening having three extended sides and one lower side;

an extended lip, coupled to a first extended side of the top opening opposite the lower side and angled down from the top opening; and a trough having a bottom coupled to the lower side of the top opening, a first side coupled to a second extended side of the top opening, and a second side coupled to a third extended side of the top opening, the trough additionally having a third side coupled to the trough bottom and at right angles to the trough's first and second sides, a gap separating the third side from the first and second sides; means for pumping the molten solder through the plenum; and means for carrying the printed circuit assembly on the means for conveying.

* * * * *